United States Patent
Kern

[11] Patent Number: 6,115,695
[45] Date of Patent: Sep. 5, 2000

[54] METHOD AND APPARATUS FOR VERIFICATION ACCURACY OF FAST FOOD ORDER

[76] Inventor: Trevor Kern, Suite 300, 8925-51 Avenue, Edmonton, Alberta, Canada, T6E 5J3

[21] Appl. No.: 09/014,361

[22] Filed: Jan. 27, 1998

[30] Foreign Application Priority Data

Oct. 24, 1997 [CA] Canada .................................... 2219172

[51] Int. Cl.⁷ ........................... G06F 17/60; G06F 153/00
[52] U.S. Cl. ................................. 705/23; 705/15; 705/16
[58] Field of Search ................................. 705/23, 15, 16

[56] References Cited

U.S. PATENT DOCUMENTS

| | | | |
|---|---|---|---|
| 3,836,755 | 9/1974 | Ehrat ....................................... | 235/383 |
| 4,373,133 | 2/1983 | Clyne et al. . | |
| 4,396,985 | 8/1983 | Ohara ....................................... | 705/15 |
| 4,661,908 | 4/1987 | Hamano et al. ........................... | 705/23 |
| 4,676,343 | 6/1987 | Humble et al. . | |
| 4,787,467 | 11/1988 | Johnson . | |
| 4,879,650 | 11/1989 | Kurimoto et al. ........................ | 705/23 |
| 5,083,638 | 1/1992 | Schneider . | |
| 5,191,749 | 3/1993 | Cappi et al. . | |
| 5,375,680 | 12/1994 | Ikeda et al. .............................. | 235/383 |
| 5,488,202 | 1/1996 | Baitz et al. .......................... | 177/25.15 |
| 5,497,314 | 3/1996 | Novak ....................................... | 705/23 |
| 5,730,252 | 3/1998 | Herbinet ................................. | 235/383 |
| 5,898,158 | 4/1999 | Shimizu et al. ........................ | 235/383 |
| 5,937,386 | 8/1999 | Frantz ....................................... | 705/15 |
| 5,987,428 | 11/1999 | Walter ....................................... | 705/23 |

Primary Examiner—Allen R. MacDonald
Assistant Examiner—Michele Stuckey Crecca
Attorney, Agent, or Firm—David and Bujold

[57] ABSTRACT

A method for order verification, the first step of which involves providing a computer processor having both data storage and computing capability. The second step involves storing data as to a weight for each of a plurality of items offered for sale in the computer processor. The third step involves inputting into the computer processor selected items that make up a customer order from the plurality of items stored in data and computing a projected total weight for the customer order. The fourth step involves assembling the selected items that make up the customer order and placing the customer order onto a weigh scale. The fifth step involves comparing an actual weight of the customer order with the projected total weight to verify the order.

6 Claims, 2 Drawing Sheets

METHOD AND APPARATUS FOR VERIFICATION ACCURACY OF FAST FOOD ORDER

FIELD OF THE INVENTION

The present invention relates to a method and apparatus for order verification.

BACKGROUND OF THE INVENTION

There are numerous businesses which require a plurality of items to be gathered to fill a customer order. These businesses vary from automotive parts wholesales to drive through restaurants. To illustrate the magnitude of the problem, with drive through restaurants statistics indicate that on average 10% of the orders contain an error. When items are missing from an order, it has a major adverse effect on customer relations. The customer has usually returned to his work or residential premises before it is discovered that a paid for item is missing. It is practically impossible for the business to verify whether the customer was actually shorted the item or is being fraudulent. The business can only do its best to mollify the annoyed customer in the hope of retaining the customer's patronage in future.

Systems have been developed for use in self service grocery stores, to verify customer orders by weighing individual items as the customer assembles the order. Such self service checkout systems are described in U.S. Pat. Nos. 4,373,133; 4,676,343; 4,787,467; and 5,191,749. Most grocery store items have bar codes. Bar code scanners are used to read bar codes on individual items, as the individual items are scanned they are concurrently weighed. The purpose of weighing each item is as a cross-check to ensure that the self service customer is not scanning a low priced item and substituting a high priced item. Each item scanned has an allowable weight variation of plus or minus a preset amount. With U.S. Pat. Nos. 4,373,133 and 4,787,467 the system totals the weight of all of the items. The customer's bag is weighed at the door as the customer exits the store, in order to ensure that the weight of the bag has not been changed by the addition of items between the checkout and the door.

Unfortunately, the teachings of these systems are not transferable to a drive through restaurant environment or other environments in which it is extremely rare for individual items to have bar codes. The foundation of the self-service systems is the weighing of individual items. The sum of the allowable weight variations on individual items renders unreliable the total weight of the order for any other purpose other than deterring tampering between the checkout and the exit.

SUMMARY OF THE INVENTION

What is required is a method and apparatus for order verification that can check an order for completeness after assembly.

According to one aspect of the present invention there is provided a method for order verification. The first step involves providing a computer processor having both data storage and computing capability. The second step involves storing data as to a weight for each of a plurality of items offered for sale. The third step involves inputting into the computer processor selected items that make up a customer order from the plurality of items stored in data and computing a projected total weight for the customer order. The fourth step involves assembling the selected items that make up the customer order and placing the customer order onto a weigh scale. The fifth step involves comparing an actual weight of the customer order as indicated by the weigh scale with the projected total weight computed by the computer processor to verify the order.

With the method for order verification, as described above, the completeness of a large order can be confirmed by its weight. This would normally occur after the order had been assembled and placed into a delivery container. Where the weight of individual items varies, a variance factor is used of plus or minus a preset amount. When the maximum variance is less than the weight of a lightest of the selected items in the customer order, the system becomes sufficiently sensitive to detect any item that may be missing. When the maximum variance is less than the weight of a lightest of the plurality of items offered for sale, the system becomes sufficiently sensitive to detect employee pilferage. The weight of the delivery container can, if significant, also be factored into the projected total weight calculation.

Although beneficial results may be obtained through the use of the method, as described above, once the customer order is determined to be underweight it still must be determined which of the selected items is missing. Even more beneficial results may, therefore, be obtained when a further step is included of having the computer processor identify an item which is missing from the customer order based upon a weight for a particular one of the selected items in the customer order which most closely approximates a weight by which the customer order is underweight.

According to another aspect of the present invention there is provided an apparatus for order verification. The apparatus includes a combination of a computer processor and a weigh scale. The computer processor has both data storage and computing capability. Data as to a weight for each of a plurality of items offered for sale is stored in data storage. Means is provided for communicating to the computer processor selected items from the plurality of items that make up a customer order. This enables the computer processor to compute a projected total weight for the customer order. An actual weight for the selected items that make up the customer order as determined by the weigh scale. Means is provided for communicating an underweight or overweight condition as determined by a comparison of the projected total weight with the actual weight.

In retail applications in which cash is handled concurrently with the filling of an order, it is preferred that the computer processor be a programmable cash register. It is also preferred that the weigh scale be coupled to the computer processor, thereby providing direct communication to the computer as to the actual weight of the customer order on the weigh scale.

In some applications, orders are not processed sequentially. When this occurs, the particular customer order being weighed must be identified. It is preferred that means be provided to generate a unique identification code for each customer order. This code can be human readable or machine readable.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

The preferred method for order verification will now be described with reference to FIGS. 1 and 2.

Figure 1:
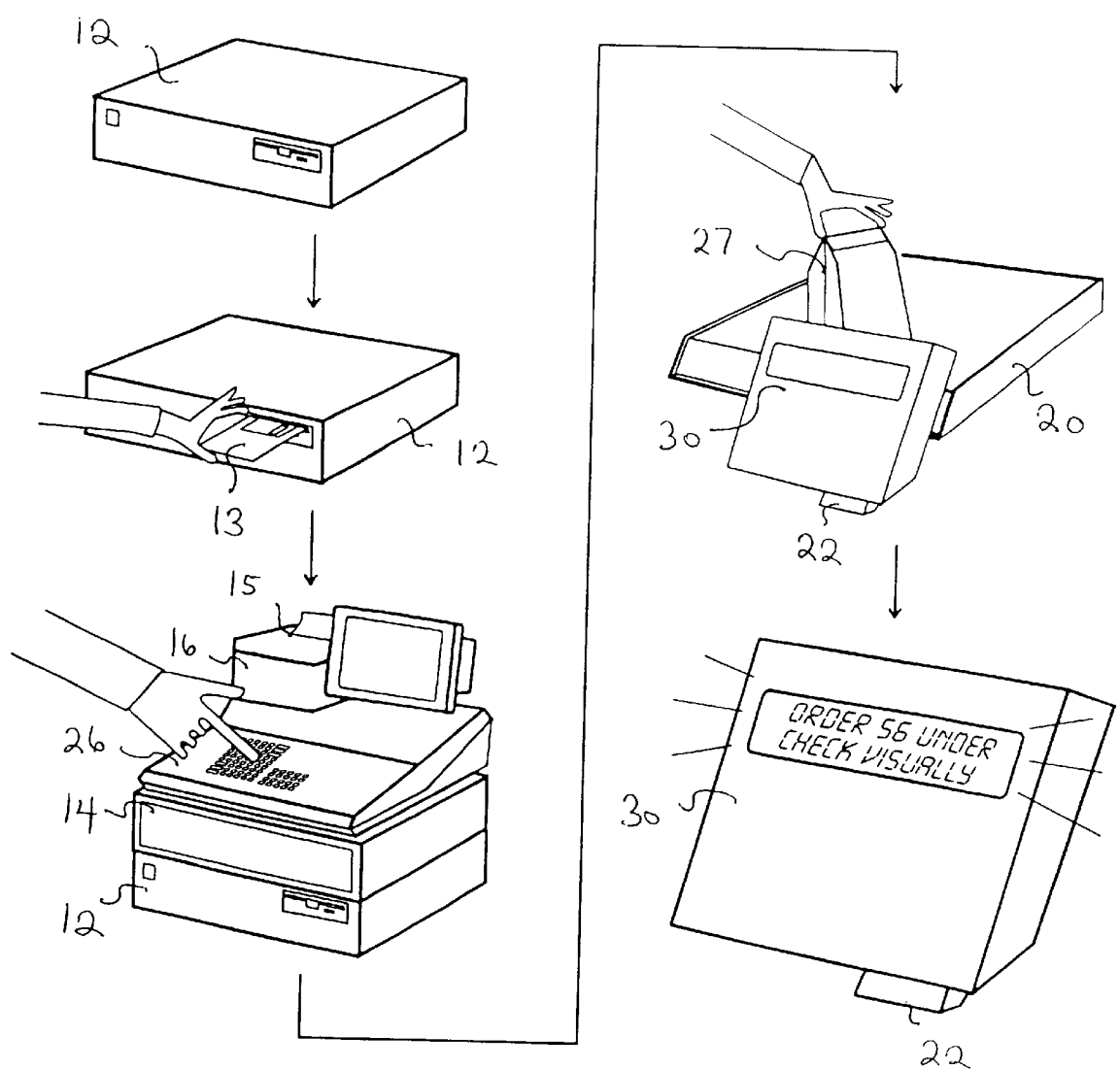
FIG. 1 is a flow diagram showing a method for order verification in accordance with the teachings of the present invention.

Referring to FIG. 1, the preferred steps are sequentially illustrated. The first step involves providing a computer processor 12 having data storage and computing capability. The second step involves storing data as to a weight for each of a plurality of items offered for sale in computer processor 12. This is most conveniently performed by downloading the data from a computer disk 13 containing such data. The third step involves inputting into computer processor 12 selected items that make up a customer order from the plurality of items stored in data and computing a projected total weight for the customer order. In the embodiment illustrated in FIG. 1, computer processor 12 is connected to a cash register 14 that has a printer 15 for printing receipts listing the selected items that make up the customer order. Cash register 14 has a keyboard 26, by means of which data is input into computer processor 12. The fourth step involves assembling the selected items that make up the customer order. In the embodiment illustrated in FIG. 1, the order is contained in bag 27. Bag 27 containing the customer order is placed onto weigh scale 20 and weighed. The fifth step involves comparing an actual weight of bag 27 containing the customer order as indicated by weigh scale 20 with the projected total weight computed by computer processor 12 to verify the order. This is communicated to an operator by means of visual display 30. In the embodiment illustrated in FIG. 1, there is illustrated a bar code generator 16 and a bar code scanner 22. Referring to FIG. 2, bar code generator 16 places a unique machine readable identification code 18 onto a receipt 28 generated by printer 15 of cash register 14. The projected total weight of bag 27 as computer by computer processor 12 is encoded into unique machine readable identification code 18. When orders are not processed in chronological order, scanner 22 is used to scan of unique identification bar code 18 to identify for computer processor 12 which of a plurality of customer orders is currently being weighed and what its weight should be.

Figure 2:
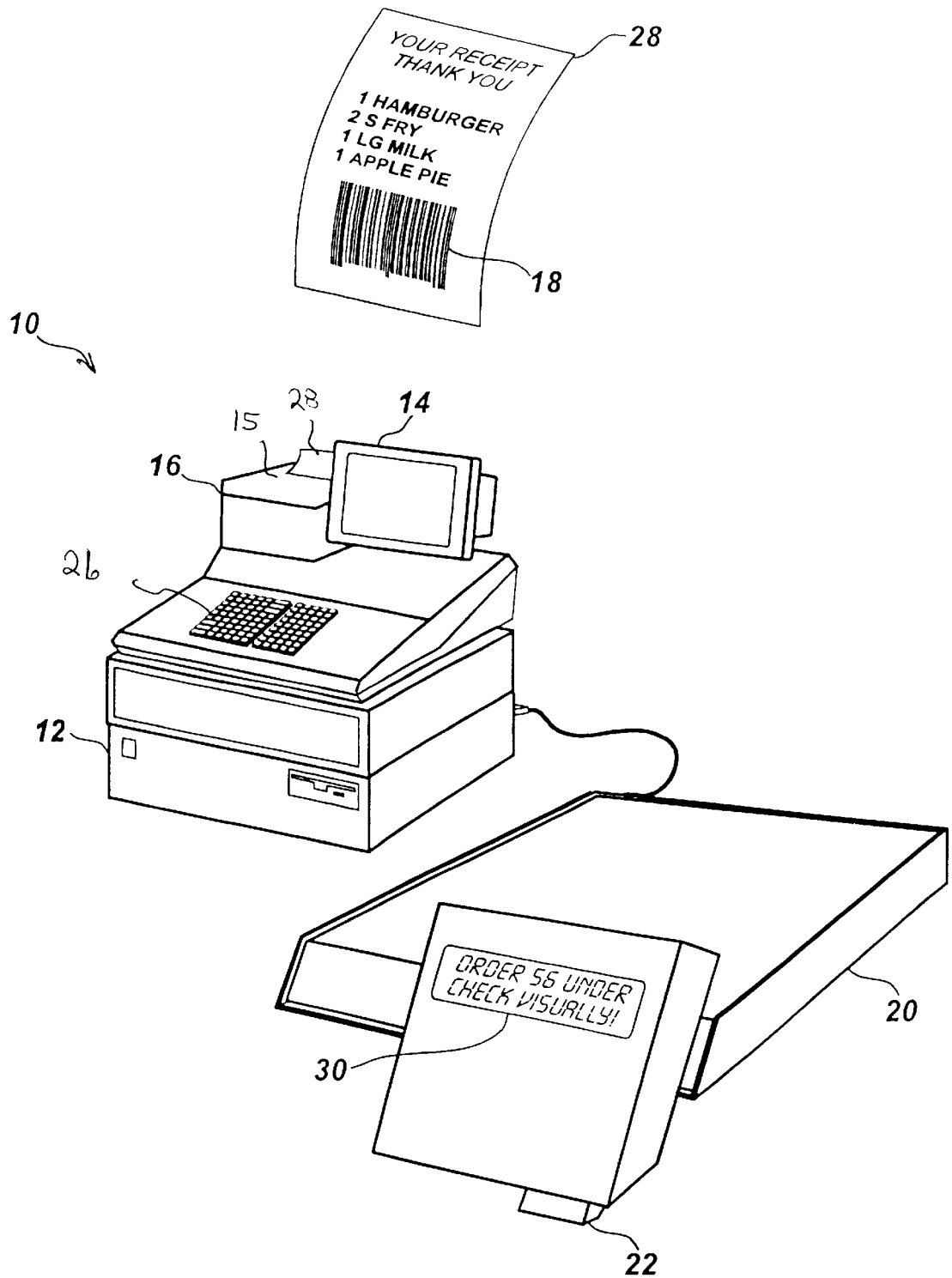
FIG. 2 is a perspective view of an order verification system constructed in accordance with the teachings of the present invention.

The combination apparatus for order verification, as described above is generally identified by reference numeral in FIG. 2.

If desired, the operation of the system described above, can be further enhanced with computer processor 12 communicating to the operator which item is missing from bag 27 containing the customer order. This calculation can be performed based upon a weight for a particular one of the plurality of items which most closely approximates a weight by which bag 27 containing the customer order is underweight. Another possible enhancement to the system is involves having computer processor 12, cash register 14 and bar code generator 16 combined into one machine.

A McDONALD'S™ restaurant was used as a BETA test site for the teachings of the present method. As every like hamburger produced by the restaurant is not identical in weight, an average weight was used with an allowable variance. In order to ensure that an item was not missed, the maximum variance for the customer order is preset so that it is always less than the weight of a lightest of the selected items in the customer order. This ensures that the system is sufficiently sensitive to detect any item that may be missing. In other applications where employee pilferage is also of concern, the maximum variance for the customer order can be preset at less than the weight of a lightest of the plurality of items offered for sale. An optional feature that could be added involves the addition of continual database programming with real-use data. This enables the system tends to take on an "artificial intelligence" aspect; constantly refining it's average weights and variances. The longer the system is in operation the "smarter" and more accurate it becomes.

The encoding of the range data in a code that is printed out on the customer receipt or is attached to a delivery container has far ranging potential. It allows the order to be checked for pilferage at various business or transfer locations, without the need to access the original system data. The weight data encoded within the bar code is not human readable. This deters pilferage, as the allowable weight is not known by any field personnel handling the container.

An order takers job is a high stress occupation—time is always of the essence. The system has been found to alleviate stress and, thereby, improve job satisfaction. Experience in use of the system has shown that it is much faster and more accurate for apparatus 10 to check an order than it is for a manual check of the order to be performed by restaurant staff. Customer complaints of shortages have been effectively eliminated. Claims of shortage can be verified by reweighing the delivery container to determine if the weight of the delivery container bag has changed since the delivery container left the restaurant premises. Knowing that this type of verification is possible has also effectively eliminated fraudulent claims of shortage.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A method for order verification, comprising the steps of:

providing a computer processor having both data storage and computing capability;

storing data as to a weight for each of a plurality of items offered for sale in the computer processor;

inputting into the computer processor selected items that make up a customer order from the plurality of items stored in data and computing a projected total weight for the customer order;

assembling the selected items to make up the customer order without input to the computer processor to individually identify the selected items during assembly;

placing the customer order onto a weigh scale without individually weighing the selected items that make up the customer order; and comparing an actual weight of the customer order as indicated by the weigh scale with the projected total weight computed by the computer processor to verify the order, while applying a maximum allowable variance for the customer order which is less than the weight of a lightest of the selected items in the customer order.

2. A method for order verification, comprising the steps of:

firstly, providing a computer processor having both data storage and computing capability;

secondly, storing data as to a weight for each of a plurality of items offered for sale in the computer processor;

thirdly, inputting into the computer processor selected items that make up a customer order from the plurality of items stored in data and computing a projected total weight for the customer order;

fourthly, assembling the selected items that make up the customer order and placing the customer order onto a weigh scale; and fifthly, comparing an actual weight of the customer order as indicated by the weigh scale with the projected total weight computed by the computer processor to verify that the actual weight of the order is within an allowable variance, sixthly, encoding the actual weight for the customer order in machine readable code upon a receipt which accompanies the customer order.

3. An apparatus for order verification comprising, in combination;

a computer processor having both data storage and computing capability, data as to a weight for each of a plurality of items offered for sale being stored in data storage;

means for communicating to the computer processor selected items from the plurality of items that make up a customer order, thereby enabling the computer processor to compute a projected total weight for the customer order;

a weigh scale coupled to the computer processor whereby an actual weight for the selected items that make up the customer order as determined by the weigh scale is communicated to the computer processor, the computer processor being programmed to apply a maximum allowable variance for the customer order which is less than the weight of a lightest of the selected items in the customer order; and means for communicating an underweight or overweight condition as determined by a comparison of the projected total weight with the actual weight in view of the maximum allowable variance.

4. The apparatus for order verification as defined in claim 3, wherein the computer processor is a programmable cash register.

5. An apparatus for order verification comprising, in combination:

a computer processor having both data storage and computing capability data as to a weight for each of a plurality of items offered for sale being stored in data storage;

means for communicating to the computer processor selected items from the plurality of items that make up a customer order, thereby enabling the computer processor to compute a projected total weight for the customer order;

a weigh scale coupled to the computer processor whereby an actual weight for the selected items that make up the customer order as determined by the weigh scale is communicated to the computer processor;

means for communicating an underweight or overweight condition as determined by a comparison of the projected total weight with the actual weight; and a machine readable code generator with associated printer coupled to the computer processor, the computer processor being programmed to encode the actual weight of the selected order in machine readable code on receipts printed by the printer.

6. A method for order verification in a restaurant, comprising the steps of:

providing a restaurant with a take out food menu;

providing a cash register having both data storage and computing capability;

storing, in the data storage of the cash register, data as to a weight for each of a plurality of food items offered for sale on the take out food menu;

inputting into the cash register selected food items that make up a customer order from the plurality of food items stored in data and computing a projected total wight for the customer order;

assembling the selected food items to make up the customer order without further input into the cash register to individually identify the selected food items during assembly;

placing the customer order onto a weigh scale without individually weighing the selected items that make up the customer order; and comparing an actual weight of the customer order as indicated by the weigh scale with the projected total weight computed by the cash register to verify the order, while applying a maximum allowable variance for the customer order which is less than the weight of a lightest of the selected food items in the customer order.

* * * * *